United States Patent [19]

Yamase et al.

[11] Patent Number: 5,330,563
[45] Date of Patent: Jul. 19, 1994

[54] PROCESS FOR SEPARATING A VOLATILE ORGANIC COMPOUND FROM A GAS

[75] Inventors: Osamu Yamase; Yasuyuki Makita; Kazuyoshi Jajima, all of Tokyo, Japan

[73] Assignee: Showa Shell Sekiyu Kabushiki Kaisha, Tokyo, Japan

[21] Appl. No.: 34,884

[22] Filed: Mar. 19, 1993

[30] Foreign Application Priority Data

Apr. 21, 1992 [JP] Japan .................... 4-128063

[51] Int. Cl.$^5$ .................................... B01D 53/14
[52] U.S. Cl. .................... 95/163; 95/169; 95/171; 95/191; 95/199; 95/223; 95/227
[58] Field of Search .......... 95/159, 160, 163, 169–171, 95/191, 192, 199, 223, 237–240

[56] References Cited

U.S. PATENT DOCUMENTS

| | | | |
|---|---|---|---|
| 1,768,521 | 6/1930 | Ayres, Jr. | 95/192 |
| 2,335,855 | 12/1943 | Hall | 95/191 |
| 2,428,521 | 10/1947 | Latchum, Jr. | 95/237 X |
| 2,685,941 | 8/1954 | Kassel | 95/237 X |
| 2,993,566 | 7/1961 | Griffin | 95/191 X |
| 3,886,759 | 6/1975 | McNamee | 95/199 X |
| 3,907,524 | 9/1975 | Haines, Jr. | 55/88 |
| 4,101,297 | 7/1978 | Uda et al. | 95/223 X |
| 4,102,983 | 7/1978 | Yamase et al. | 55/84 X |
| 4,383,838 | 5/1983 | Barten et al. | 95/192 X |
| 4,574,005 | 3/1986 | Cobbs, Jr. et al. | 95/191 |
| 4,670,028 | 6/1987 | Kennedy | 55/88 X |
| 5,198,000 | 3/1983 | Grasso et al. | 95/191 X |

FOREIGN PATENT DOCUMENTS

| | | |
|---|---|---|
| 019064 | 10/1986 | European Pat. Off. |
| 2289593 | 10/1975 | France. |
| 52-081070 | 7/1977 | Japan. |
| 2089677 | 6/1982 | United Kingdom. |

OTHER PUBLICATIONS

Information in English with respect JP 22503/83 (p. 3, line 32).

Primary Examiner—Robert Spitzer
Attorney, Agent, or Firm—Cushman, Darby & Cushman

[57] ABSTRACT

A process is disclosed for recovering a volatile organic compound at a recovery of 90 to 96% by volume from a gas generated from gasoline, kerosine, benzene, and alcohol discharged from storage tanks, tank trucks, and tank lorries. In the process comprising absorption stages followed by desorption stages for the volatile organic compound, the pressure at the desorption stages is controlled within the area below, for instance, curves C' and B in FIG. 1 of the drawings according to the concentration of the volatile organic compound in the gas to be fed to a first absorption stage.

4 Claims, 2 Drawing Sheets

PROCESS FOR SEPARATING A VOLATILE ORGANIC COMPOUND FROM A GAS

BACKGROUND OF THE INVENTION

1. Field of the Invention

The present invention relates to a technology by which a volatile organic compound can be recovered effectively from a mixed gas containing the organic compound in the state of gas to avoid the compound from being diffused in atmospheric air.

2. Discussion of the Background

Volatile hydrocarbons are diffused from storage tanks in atmospheric air when atmospheric temperature rises. Also, the volatile hydrocarbons are diffused in atmospheric air when they are flowed into storage tanks or when they are filled in tank lorries from storage tanks. Diffused hydrocarbons are said to form substances causing "photochemical smog". Accordingly, regulations have been carried out in Japan and other countries to control the concentration of the hydrocarbons in an exhaust or flue gas, and more severe regulations have lately been issued in several countries, the United States being a leading country.

For instance, a standard hydrocarbon concentration in the exhaust or flue gases at outlets is established under a prefectural regulation in Nagoya, Japan, which is the severest regulation in the past and by which the hydrocarbon concentration at the outlets is prescribed to be lower than 5% by volume (corresponding to about 80% by volume in terms of the recovery (as referred hereinafter) of hydrocarbon from a gas having a hydrocarbon concentration of 21% by volume at inlets). Under EPA in the United States, however, such harsh standards have been issuing that the discharge of VOC (volatile organic compound) shall be less than 35 mg/l gasoline for bulk gasoline terminals newly constructed or expanded after Dec. 17, 1980 and that recovery at vapor recovery systems shall be higher than 95% by weight for facilities storing petroleum products having a vapor pressure of 78 to 570 mmHg and newly constructed or expanded after May 19, 1978.

Several methods can be taken into consideration for recovering a hydrocarbon from a vapor. For instance, there have been proposed methods in which the hydrocarbon is separated from a vapor containing the hydrocarbon by adsorption with porous adsorbents such as activated carbons or separated by low temperature processing.

In the adsorption method, however, there is a danger of firing since a large amount of the heat of adsorption will be generated. In the low temperature processing method, the hydrocarbon vapor must be cooled down to a temperature lower than $-35°$ C. in order to increase the recovery percentage since the vapor has a very low liquefying temperature and thus this method is economically disadvantageous.

On the other hand, a method is known for separating a hydrocarbon from a hydrocarbon vapor safely and effectively wherein the vapor is washed with a liquid to absorb at an ambient temperature under an atmospheric pressure, the hydrocarbon absorbed in the liquid is separated to recover, and then the liquid is recycled to the washing.

Suitable liquids used for the absorption are ones which are insoluble in water, have a strong absorption power to hydrocarbon gas, and having such a low vapor pressure such that the liquids will not be lost when hydrocarbon is separated for recovery. Examples of the liquids comprise, as a major component, at least one compound selected from the group consisting of phthalic acid esters, silicic acid esters, phosphoric acid esters, fatty acid esters, alkylbenzene, alkylnaphthalene, and α-olefins. The liquids may additionally contain less than 75% by weight of a refined mineral oil having a viscosity of 5 to 20 cst at a temperature of 37.8° C., a boiling point of 250° to 450° C., and an average molecular weight of 200 to 350.

According to the absorption method, the hydrocarbon concentration at the outlets can be controlled lower than 5% by volume by using a system composed of an absorption column, desorption column, recovery column, and vacuum pump. However, the absorption method has a defect that a severer standard regulated under, for example, the EPA in the United States can not be cleared.

An improved method for recovering a volatile organic compound from a gas by an absorption method has been proposed in U.S. Pat. No. 4,102,983 wherein a liquid mixture of an ester of phosphoric acid, silicic acid, or fatty acid with a mineral oil is used, an absorption liquid containing a volatile organic compound dissolved therein is subjected to flashing under a reduced pressure in a desorption column, and the liquid subjected to the flashing is recycled.

Another method has been proposed in Japanese patent publication 22503/1983 in which the flashing is carried out in two or more stages using two or more vessels kept under different reduced pressures.

However, in the method wherein the absorption liquid is recycled, the volatile organic compound will remain in the desorption column in an amount corresponding to the compound's vapor pressure under a reduced pressure at the stage of regeneration of the absorption liquid in the desorption column, and the remaining compound will obstruct the increase of the recovery percentage of volatile organic compound in the absorption column.

SUMMARY OF THE INVENTION

Thus, the object of the present invention is to provide a novel method for separating or recovering a volatile organic compound from a gas or vapor of gasoline, kerosene, benzene, or alcohol discharged from storage tanks, tank trucks, or tank lorries at a recovery of 90 to 96% by volume.

The term "gas" as used hereinafter is intended to have the meaning of gas, vapor and mist.

The present invention relates to a process for separating a volatile organic compound from a gas containing the organic compound by introducing the gas into a first absorption column at a lower part in the first absorption column, supplying a liquid for first absorption into the first absorption column at an upper part in the first absorption column to contact countercurrently with the gas to absorb a major portion of the organic compound in the gas, introducing the gas leaving the first absorption column and containing a remaining organic compound into a second absorption column at a lower part in the second absorption column, supplying another liquid for second absorption into the second absorption column at an upper part in the second absorption column to contact countercurrently with the gas from the first absorption column, supplying the first absorption liquid leaving a lower part in the first absorption column into at a first desorption column at an upper part in the first desorption column, recycling the liquid leaving at a lower part in the first desorption column back to the first absorption column as the liquid for the first absorption, supplying the second absorption liquid leaving at a lower part in the second absorption column into a second desorption column at an upper part in the second desorption column, recycling the liquid leaving at a lower part in the second desorption column back to the second absorption column as the liquid for the second absorption, and recovering a remaining volatile organic compound, the improvement which comprises controlling the operating pressure at the first and the second desorption columns within the area below the curves C' and B in FIG. 1 of the drawings relative to the concentration of the volatile organic compound in the gas to be fed into the first absorption column to reduce the amount of the volatile organic compound in a discharging gas to less than 10 when the amount of the volatile organic compound in the feeding gas was assumed to be 100 (Embodiment 1).

Also, the present invention relates to a process for separating a volatile organic compound from a gas containing the organic compound by introducing the gas into a first absorption column at a lower part in the first absorption column, supplying a liquid for first absorption into the first absorption column at an upper part in the first absorption column to contact countercurrently with the gas to absorb a major portion of the organic compound in the gas, introducing the gas leaving the first absorption column and containing a remaining organic compound into a second absorption column at a lower part in the second absorption column, supplying another liquid for second absorption into the second absorption column at an upper part in the second absorption column to contact countercurrently with the gas from the first absorption column, supplying the first absorption liquid leaving at a lower part in the first absorption column into a first desorption column at an upper part in the first desorption column, recycling the liquid leaving at a lower part in the first desorption column back to the first absorption column as the liquid for the first absorption, supplying the second absorption liquid leaving at a lower part in the second absorption column into a second desorption column at an upper part in the second desorption column, recycling the liquid leaving at a lower part in the second desorption column back to the second absorption column as the liquid for the second absorption, and recovering a remaining volatile organic compound, the improvement which comprises controlling the operating pressure at the first and the second desorption columns within the area below the curves A' and B in FIG. 1 of the drawings relative to the concentration of the volatile organic compound in the gas to be fed into the first absorption column to reduce the amount of the volatile organic compound in a discharging gas to less than 10 when the amount of the volatile organic compound in the feeding gas was assumed to be 100, while introducing air into the second desorption column at a lower part in the second desorption column (Embodiment 2).

Further, the present invention relates to the process according to Embodiment 1 wherein the operating pressure at the first and the second desorption columns are controlled within the area below the curve C in FIG. 1 relative to the concentration of the volatile organic compound in the gas to be fed into the first absorption column to reduce the amount of the volatile organic compound in a discharging gas to less than 5 when the amount of the volatile organic compound in a feeding gas was assumed to be 100 (Embodiment 3).

Still further, the present invention relates to the process according to Embodiment 2 wherein the operating pressure at the first and the second desorption columns are controlled within the area below the curves A and B in FIG. 1 of the drawings relative to the concentration of the volatile organic compound in the gas to be fed into the first absorption column to reduce the amount of the volatile organic compound in a discharging gas to less than 5 when the amount of the volatile organic compound in a feeding gas was assumed to be 100 (Embodiment 4).

DETAILED DESCRIPTION OF THE INVENTION

Now, the present invention will be described in further detail with reference to drawings.

Figure 1:
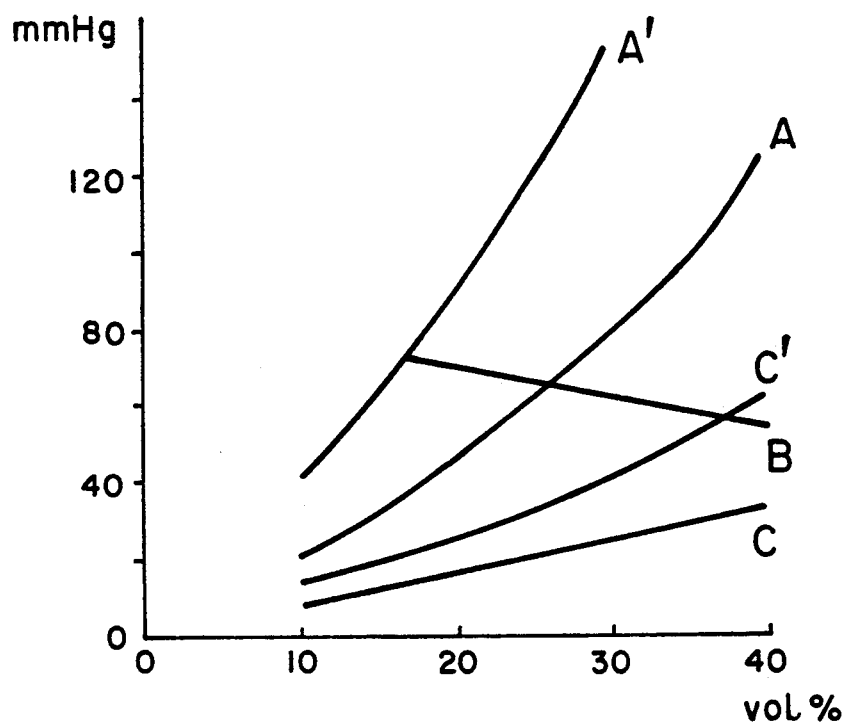
FIG. 1 is a graph showing the relationship between the pressure in a desorption column and a concentration of a volatile organic compound contained in a gas to be introduced into a first absorption column.

In FIG. 1, line A is a graphic representation of equation A $$P = 190 f / (1 - 0.95 f) \qquad (A)$$

wherein P is an operating pressure (mmHg) in a first and second desorption column, and f is a concentration (molar fraction) of a volatile organic compound in a gas to be introduced into the first absorption column at a lower part in the first absorption column.

The equation A shows the relationship between the concentration of a volatile organic compound in the feed gas and an operating pressure at the first and second desorption column keeping out of explosion limit of the second desorption column outlet gas by regulating air injection rate to the second desorption column at a recovery of 95% by volume of a volatile organic compound.

In FIG. 1, line A' is a graphic representation of equation A'

$$P = 380 f / (1 - 0.90 f) \qquad (A')$$

wherein P and f have the same meanings as in equation A except that the recovery is set at 90% by volume.

The equation A' shows the relationship between the concentration of a volatile organic compound in the feed gas and an operating pressure at the first and second desorption column keeping out of explosion limit of the second desorption column outlet gas by regulating air injection rate to the second desorption column at a recovery of 90% by volume of a volatile organic compound.

In FIG. 1, line B is a graphic representation of equation B $$P = -70f + 83 \quad (B)$$

wherein P and f have the same meanings as in equation A.

In the combination of the first absorption column with first desorption column, when an amount of a volatile organic compound contained in a rich oil leaving the first absorption column at a lower part in the first absorption column and being fed into the first desorption column is large, entrainment of the liquid will occur. If the entrainment occurred, the liquid will not only be lost but also flowed into a vacuum pump, leading to a cause of a mechanical trouble.

The amount of entrainment of the liquid accompanied with the evaporation of volatile organic compound will increase with increase in the amount of volatile organic compound contained in the rich oil, and 35% by mole (10% by weight) is an upper limit of the amount of the volatile organic compound which is permitted to contain in the rich oil, derived empirically through actual operation and from the view point of safety. When the amount is more than 35% by mole, the entrainment will occur such an extent that operation is impossible.

The concentration of the volatile organic compound in the rich oil will decrease with decrease in the concentration of the volatile organic compound in the gas to be fed to the first absorption column, since the amount of volatile organic compound accumulated in the liquid will decrease. Thus, the pressure in the first desorption column necessary to secure the amount in the liquid at lower than 35% by mole may become higher with decrease in the concentration of the hydrocarbon in the gas to be fed into the first absorption column. The second desorption column is operated at the same pressure as the first desorption column.

In FIG. 1, line C is a graphic representation of equation C $$P = 3.86 + 45f + 75.1f^2 \quad (C)$$

wherein P and f have the same meanings as in equation A.

The line C shows the relationship between operating pressure P necessary when the air is not bubbled and concentration f of a volatile organic compound in the gas to be fed to the first absorption column at a lower part in the first absorption column at a recovery of the volatile organic compound of 95% by volume.

In FIG. 1, line C' is a graphic representation of equation C'

$$P = 8.31 + 51f + 200f^2 \quad (C')$$

wherein P and f have the same meanings as in equation A except that the recovery is 90% by volume.

Figure 2:
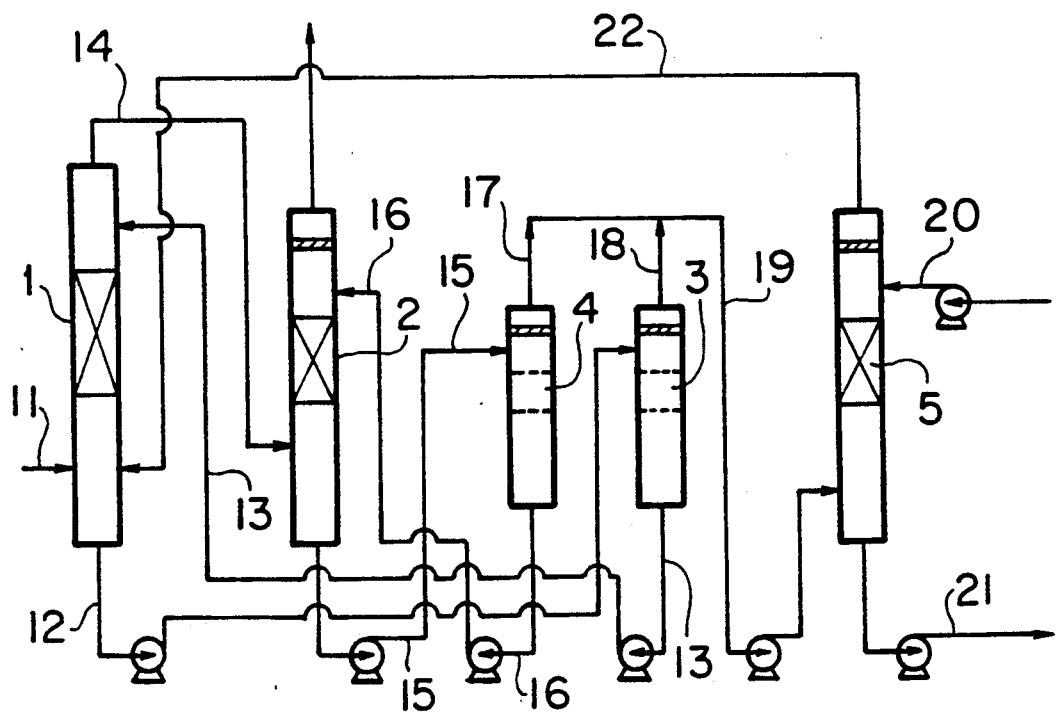
FIG. 2 is a first flow diagram of a system for conducting the process according to Embodiments 1 and 3 of the present invention.

FIG. 2 is a first flow diagram of a system for conducting a first and third embodiments of the present invention. In FIG. 2, a gas containing the volatile organic compound, for example a hydrocarbon gas, is introduced through a line 11 into a first absorption column 1 at a lower part in the first absorption column, and contacted countercurrently with a liquid for first absorption introduced through a line 13 into the first absorption column at an upper part in the first absorption column to separate a major portion of the volatile organic compound from the gas.

The gas thus treated is introduced through a line 14 into a second absorption column at a lower part in the second absorption column 2. The liquid which absorbed the volatile organic compound in the first absorption column 1 is introduced through a line 12 into a first desorption column 3 at an upper part in the first desorption column 3.

Operating conditions for the first desorption column are determined so that the conditions of the present invention are satisfied. In the first desorption column 3, the volatile organic compound is separated from the absorption liquid. Absorption liquid from which the volatile organic compound was separated is recycled through a line 13 back to the first absorption column 1 as the liquid for first absorption.

The gas containing the volatile organic compound separated in the first and second desorption columns is fed through lines 17, 18 and 19 to a recovery column 5 for recovering the volatile organic compound. A liquid for recovering the volatile organic compound is supplied through a line 20 to an upper part in the recovery column 5. The volatile organic compound is recovered from a line 21, and a treated gas is recycled back to the first absorption column 1 via line 22.

On the other hand, a liquid (second absorption liquid) which absorbed a remaining volatile organic compound in the second absorption column is introduced through a line 15 into a second desorption column 4 at an upper part in the second desorption column. The second absorption liquid from which the volatile organic compound was separated is recycled through a line 16 back to the second absorption column 2. The gaseous organic compound separated in the second desorption column is fed through lines 17 and 19 to the recovery column 5 for recovering the volatile organic compound.

Figure 3:
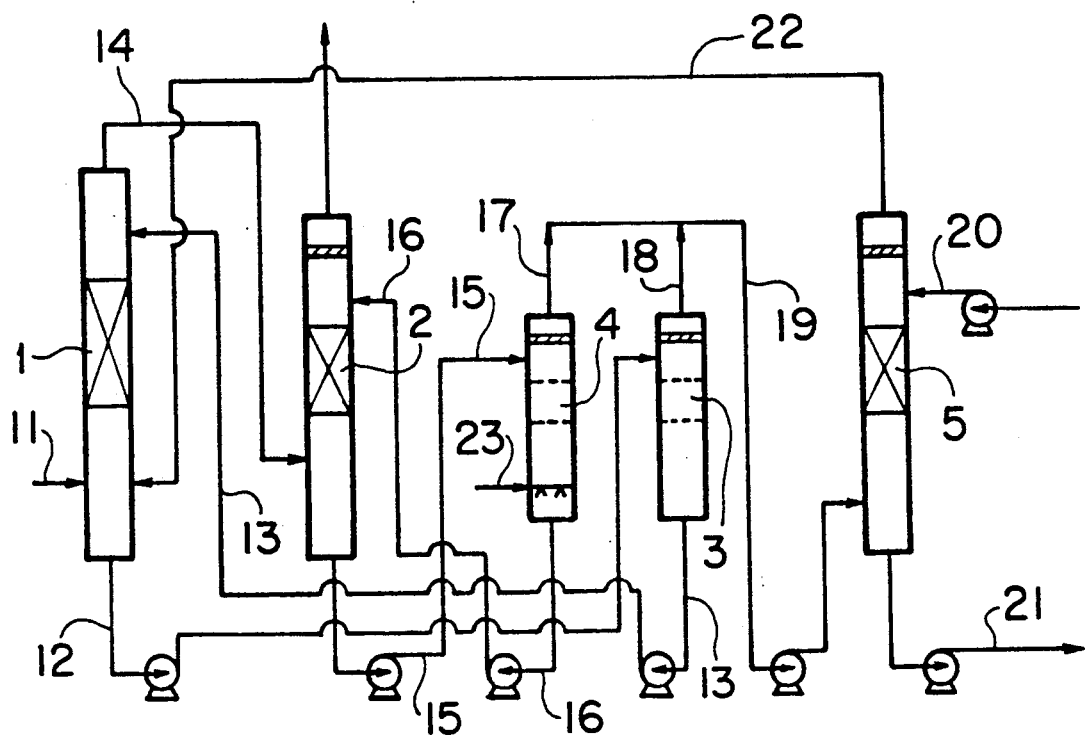
FIG. 3 is a second flow diagram of a system for conducting the process according to Embodiments of 2 and 4 of the present invention.

FIG. 3 is a second flow diagram of a system for conducting a second and fourth embodiments of the present invention. The diagram is the same as that of FIG. 2 except that an air introducing pipe 23 for air bubbling is connected to a lower part in the second desorption column 4.

Figure 4:
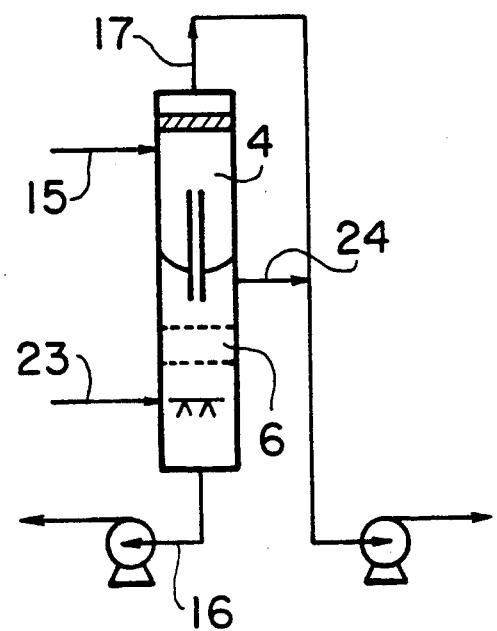
FIG. 4 is a flow diagram of a modified system of the second desorption column in FIG. 3 for conducting the process of the present invention.

FIG. 4 is a flow diagram of a modified system of the process of the present invention in which a third desorption column 6 is provided below the second desorption column 4 shown in FIG. 3, and air bubbling is conducted in a third desorption column 6. Line 24 in FIG. 4 feeds a volatile organic compound to recovery column 5 after being desorbed by air bubbling in column 6.

According to the present invention, the relationship between the pressure (regeneration pressure) in each of the desorption columns and the concentration of a so-called inert component other than the volatile organic compound is not affected even if a gas flow rate was varied.

As a matter of course, in the present invention, air introducing rate and total flow rate in a vacuum pump are varied in proportion to gas flow rate.

EXAMPLES

Now, the present invention will be described in further detail with reference to Examples. However, it should be understood that the present invention is by no means restricted by such specific Examples.

The points in each of Examples 1 through 4 are summarized as follows:

Example 1: Corresponding to embodiment 2 ( area below curves A'-B, hydrocarbon recovery was higher than 90% by volume); refer to Tables 4 to 5; air was bubbled.

Example 2: Corresponding to embodiment 4 ( area below curves A-B, hydrocarbon recovery was higher than 95% by volume); refer to Tables 6 to 7; air was bubbled.

Example 3: Corresponding to embodiment 1 ( area below curves C'-B, hydrocarbon recovery was higher than 90%); refer to Tables 8 to 9; air was not bubbled.

Example 4: Corresponding to embodiment 3 ( area below curve C, hydrocarbon recovery was higher than 95% by volume); refer to Tables 10 to 11; air was not bubbled.

All of the Examples were to achieve the hydrocarbon recovery of higher than 90% by volume at a hydrocarbon concentration in a feeding gas (gas to be fed to the first absorption gas) of 10 to 40% by volume. Accordingly, the molar ratio of liquid/gas was suitably 8 at the absorption stages, operating pressure at the desorption stages was determined depending on the hydrocarbon concentration in the feeding gas, and a considerable amount of air was bubbled in the second desorption column in Examples 1 and 2 to accelerate the regeneration of the liquid for absorption.

First, the conditions and results in Examples 1 and 3 are explained specifically by comparing them with reference to Tables 4 to 5 and 8 to 9. In Example 1 (Tables 4 to 5), air was bubbled in the second desorption column at a gas flow rate of 1000 Nm$^3$/hr at the inlet in the first absorption column, and in Example 3 (Tables 8 to 9), air was not bubbled but the inlet gas flow rate was the same as in Example 1. The recovery of the hydrocarbon was aimed at 90% by volume in both Examples.

The pressure in the first and second desorption columns in Example 1 (Tables 4 to 5) was higher than that in Example 3 (Tables 8 to 9) since air was bubbled in Example 1. As the result, the necessary gas flow rate of vacuum pump was 98 m$^3$/min at maximum in Example 1 (Tables 4 to 5) while the necessary gas flow rate was 110 m$^3$/min in Example 3 (Tables 8 to 9) at maximum. This indicates that the necessary gas flow rate of a vacuum pump was higher by 12 m$^3$/min in Example 3 wherein air was not bubbled.

Calculation was performed for the number of necessary vacuum pumps having a rated capacity of 50 m$^3$/min (at a suction pressure of 25 mmHg) from the data shown in Tables 4 to 5 and 8 to 9 to obtain the results that 1.6 to 2.0 vacuum pumps are necessary to be used in Example 1 (Tables 4 to 5) while 1.8 to 2.5 vacuum pumps are necessary in Example 3 (Tables 8 to 9) as shown in detail in Table 1.

TABLE 1

| Number of necessary vacuum pumps (rated capacity 50 m$^3$/min, gas recovery 90% by volume) | | | | | | | | |
|---|---|---|---|---|---|---|---|---|
| Hydrocarbon concentration in feeding gas (%) | 10.6 | 12.7 | 16.0 | 19.9 | 24.6 | 30 | 36.5 | 40.2 |
| Example 3 Air was not bubbled. | 2.5 | 2.4 | 2.4 | 2.2 | 1.9 | 1.8 | 1.6 | 1.7 |
| Example 1 Air was not bubbled. | 2.0 | 1.9 | 1.8 | 1.7 | 1.6 | 1.6 | — | — |

Next, the conditions and results in Examples 2 and 4 are explained specifically by comparing them with reference to Tables 6 to 7 and 10 to 11. In Example 2 (Tables 6 to 7), air was bubbled in the second desorption column at a gas flow rate of 1000 Nm$^3$/hr at the inlet in the first absorption column, and in Example 4 (Tables 10 to 11), air was not bubbled but the inlet gas flow rate was the same as in Example 2. The recovery of the hydrocarbon was aimed at 95% by volume in both Examples.

The pressure in the first and second desorption columns in Example 2 (Tables 6 to 7) was higher than that in Example 4 (Tables 10 to 11) since air was bubbled in Example 2. As the result, the necessary gas flow rate of vacuum pump was 160 m$^3$/min at maximum in Example 2 (Tables 6 to 7) while the necessary gas flow rate was 200 m$^3$/min in Example 4 (Tables 10 to 11) at maximum. This indicates that the necessary gas flow rate of a vacuum pump was higher by 40 m$^3$/min in Example 4 wherein air was not bubbled.

As in the cases in Examples 2 and 4, calculation was performed for the number of necessary vacuum pumps having a rated capacity of 50 m$^3$/min (at a suction pressure of 25 mmHg) from the data shown in Tables 6 to 7 and 10 to 11 to obtain the results that 2.5 to 3.8 vacuum pumps are necessary to be used in Example 2 (Tables 6 to 7) while 3.1 to 7.1 vacuum pumps are necessary in Example 4 (Tables 10 to 11) as shown in detail in Table 2.

TABLE 2

| Number of necessary vacuum pumps (rated capacity 50 m$^3$/min, gas recovery 95% by volume) | | | | | | | | |
|---|---|---|---|---|---|---|---|---|
| Hydrocarbon concentration in feeding gas (%) | 10.6 | 12.7 | 16.0 | 19.9 | 24.6 | 30 | 36.5 | 40.2 |
| Example 4 Air was not bubbled. | 7.1 | 5.8 | 5.1 | 4.5 | 4.4 | 3.6 | 3.3 | 3.1 |
| Example 2 Air was bubbled. | 3.8 | 3.5 | 3.4 | 3.3 | 2.8 | 2.7 | 2.5 | 2.5 |

Results in respect of the number of necessary vacuum pumps are summarized as follows:

| Recovery (% by volume) | Air bubbling | Number of necessary vacuum pumps (rated capacity 50 m$^3$/min) |
|---|---|---|
| 90 | no | 1.8 to 2.5 |
| 90 | yes | 1.6 to 2.0 |
| 95 | no | 3.1 to 7.1 |
| 95 | yes | 2.5 to 3.8 |

As will be understood from the above, number of vacuum pumps to be used must be considerably increased in order to increase the gas recovery percentage.

From the data obtained in Examples 1 through 4, the following conclusions can be drawn:

(i) When the recovery of hydrocarbon from a gas containing 10 to 40% by volume of the hydrocarbon is to be kept at a level of higher than 90% by volume in a hydrocarbon gas recovery unit, operating conditions in the desorption columns will be dominant, and it will lead to the reduction of the cost of plant to maintain the operating pressure in the desorption column as high as possible.

(ii) Under such conditions, it will become possible to maintain the operating pressure in the desorption columns at a high level when a considerable amount of air is bubbled in the second desorption column.

Actually, a rational or effective plant can be designed by obtaining best operating conditions for a minimum plant cost through a simulation at a required gas recovery to be aimed.

For convenience, an example of an expected performance of a vacuum pump is shown in Table 3.

TABLE 3

| | Discharge pressure 0.1 kg/cm² g | | | | | | |
|---|---|---|---|---|---|---|---|
| Suction pressure mmHg | 60 | 55 | 50 | 45 | 40 | 35 | 30 |
| Vacuum flow rate m³/min | 59 | 58.5 | 58 | 57 | 56.5 | 54.5 | 53 |
| Suction pressure mmHg | 25 | 20 | 15 | 10 | 9 | 8 | |
| Vacuum flow rate m³/min | 50 | 45 | 41.5 | 30 | 27.5 | 20 | |

EXAMPLE 1

Corresponding to embodiment 2 (area below curves A'-B, recovery higher than 90% by volume)

TABLE 4

| | | | | |
|---|---|---|---|---|
| Hydrocarbon concentration in feeding gas % by volume | 10.6 | 12.7 | 16.0 | 19.9 |
| First absorption column, inlet gas flow rate Nm³/hr | 1000 | 1000 | 1000 | 1000 |
| First absorption column, inlet liquid flow rate T/hr | 100.2 | 98.3 | 94.3 | 90.1 |
| First absorption column, operating pressure mm Hg | 765 | 765 | 765 | 765 |
| First absorption column, operating temperature °C. | 35.2 | 35.3 | 35.3 | 35.4 |
| First absorption column, outlet gas flow rate Nm³/hr | 954 | 934 | 907 | 871 |
| First absorption column, hydrocarbon concentration in outlet gas % by volume | 2.90 | 3.23 | 4.10 | 4.87 |
| First absorption column, hydrocarbon concentration in outlet liquid % by weight | 2.5 | 2.9 | 3.8 | 4.8 |
| Second absorption column, inlet liquid flow rate T/hr | 98.1 | 95.5 | 91.5 | 86.0 |
| Second absorption column, operating pressure mm Hg | 760 | 760 | 760 | 760 |

TABLE 4-continued

| | | | | |
|---|---|---|---|---|
| Second absorption column, operating temperature °C. | 35.1 | 35.1 | 35.2 | 35.2 |
| Second absorption column, outlet gas flow rate Nm³/hr | 925 | 905 | 876 | 838 |
| Second absorption column, hydrocarbon concentration in outlet gas % by volume | 1.15 | 1.38 | 1.77 | 2.30 |
| First desorption column, operating pressure mmHg | 23 | 26 | 31 | 36 |
| First desorption column, operating temperature °C. | 35.3 | 35.5 | 35.5 | 35.7 |
| Second desorption column, operating pressure mmHg | 23 | 26 | 31 | 36 |
| Second desorption column, operating temperature °C. | 35.1 | 35.2 | 35.3 | 35.4 |
| Second desorption column, air bubble rate Nm³/hr | 24.5 | 23.5 | 22.4 | 20.8 |
| Second desorption column, inlet gas concentration in outlet gas % by volume | 67.3 | 65.7 | 59.9 | 56.7 |
| Hydrocarbon recovery (first absorption column) % by volume | 74.8 | 77.1 | 77.6 | 79.4 |
| Hydrocarbon recovery (second absorption column % by volume) | 61.0 | 58.1 | 57.9 | 54.0 |
| Hydrocarbon recovery (total) % by volume. | 90.0 | 90.2 | 90.3 | 90.3 |
| Vacuum pump flow rate, m³/min | 97.9 | 95.5 | 92.9 | 92.7 |

EXAMPLE 1 (Continued)

Corresponding to embodiment 2 (area below curves A'-B, recovery higher than 90% by volume)

TABLE 5

| | | |
|---|---|---|
| Hydrocarbon concentration in feeding gas % by volume | 24.6 | 30.0 |
| First absorption column, inlet gas flow rate Nm³/hr | 1000 | 1000 |
| First absorption column, inlet liquid flow rate T/hr | 84.6 | 79.1 |
| First absorption column, operating pressure mm Hg | 765 | 765 |
| First absorption column, operating temperature °C. | 35.5 | 35.6 |
| First absorption column, outlet gas flow rate Nm³/hr | 836 | 786 |
| First absorption column, hydrocarbon concentration in outlet gas % by volume | 6.19 | 7.46 |
| First absorption column, hydrocarbon concentration in outlet liquid % by weight | 6.3 | 7.9 |
| Second absorption column, inlet liquid flow rate T/hr | 80.2 | 73.0 |
| Second absorption column, operating pressure mm Hg | 760 | 760 |
| Second absorption column, operating temperature °C. | 35.3 | 35.3 |
| Second absorption column, outlet gas flow rate Nm³/hr | 800 | 748 |
| Second absorption column, hydrocarbon concentration in outlet gas % by volume | 3.05 | 3.98 |

TABLE 5-continued

| | | |
|---|---|---|
| First desorption column, operating pressure mmHg | 44 | 51 |
| First desorption column, operating temperature °C. | 36.0 | 36.2 |
| Second desorption column, operating pressure mmHg | 44 | 51 |
| Second desorption column, operating temperature °C. | 35.5 | 35.5 |
| Second desorption column, air bubble rate Nm³/hr | 24.2 | 21.8 |
| Second desorption column, inlet gas concentration in outlet gas % by volume | 54.8 | 51.1 |
| Hydrocarbon recovery (first absorption column) % by volume | 79.8 | 81.2 |
| Hydrocarbon recovery (second absorption column % by volume) | 52.3 | 48.6 |
| Hydrocarbon recovery (total) % by volume | 90.1 | 90.1 |
| Vacuum pump flow rate m³/min | 90.5 | 90.4 |

EXAMPLE 2

Corresponding to embodiment 4 (area below curves A-B, recovery higher than 95% by volume)

TABLE 6

| | | | | |
|---|---|---|---|---|
| Hydrocarbon concentration in feeding gas % by volume | 10.6 | 12.7 | 16.0 | 19.9 |
| First absorption column, inlet gas flow rate Nm³/hr | 1000 | 1000 | 1000 | 1000 |
| First absorption column, inlet liquid flow rate T/hr | 100.2 | 100.0 | 94.4 | 93.9 |
| First absorption column, operating pressure mm Hg | 765 | 765 | 765 | 765 |
| First absorption column, operating temperature °C. | 35.1 | 35.2 | 35.3 | 35.4 |
| First absorption column, outlet gas flow rate Nm³/hr | 944 | 925 | 893 | 862 |
| First absorption column, hydrocarbon concentration in outlet gas % by volume | 1.84 | 2.21 | 2.60 | 3.18 |
| First absorption column, hydrocarbon concentration in outlet liquid % by weight | 1.6 | 1.9 | 2.8 | 3.1 |
| Second absorption column, inlet liquid flow rate T/hr | 98.7 | 96.1 | 92.0 | 88.3 |
| Second absorption column, operating pressure mm Hg | 760 | 760 | 760 | 760 |
| Second absorption column, operating temperature °C. | 35.1 | 35.1 | 35.2 | 35.2 |
| Second absorption column, outlet gas flow rate Nm³/hr | 921 | 901 | 869 | 835 |
| Second absorption column, hydrocarbon concentration in outlet gas % by volume | 0.54 | 0.71 | 0.88 | 1.14 |
| First desorption column, operating pressure mmHg | 15 | 17 | 20 | 23 |
| First desorption column, operating temperature °C. | 35.3 | 35.4 | 35.5 | 35.7 |
| Second desorption column, operating pressure mmHg | 15 | 17 | 20 | 23 |

TABLE 6-continued

| | | | | |
|---|---|---|---|---|
| Second desorption column, operating temperature °C. | 35.1 | 35.1 | 35.2 | 35.3 |
| Second desorption column, air bubble rate Nm³/hr | 25.9 | 24.7 | 22.0 | 27.7 |
| Second desorption column, inlet gas concentration in outlet gas % by volume | 74.1 | 71.4 | 68.5 | 67.6 |
| Hydrocarbon recovery (first absorption column) % by volume | 83.6 | 83.9 | 85.6 | 86.2 |
| Hydrocarbon recovery (second absorption column % by volume) | 71.1 | 68.5 | 65.4 | 65.2 |
| Hydrocarbon recovery (total) % by volume | 95.3 | 94.9 | 95.0 | 95.2 |
| Vacuum pump flow rate m³/min | 156.9 | 152.3 | 155.0 | 157.1 |

EXAMPLE 2 (Continued)

Corresponding to embodiment 4 (area below curves A-B, recovery higher than 95% by volume)

TABLE 7

| | | | | |
|---|---|---|---|---|
| Hydrocarbon concentration in feeding gas % by volume | 24.6 | 30.0 | 36.5 | 40.2 |
| First absorption column, inlet gas flow rate Nm³/hr | 1000 | 1000 | 1000 | 1000 |
| First absorption column, inlet liquid flow rate T/hr | 88.3 | 84.2 | 78.3 | 74.6 |
| First absorption column, operating pressure mm Hg | 765 | 765 | 765 | 765 |
| First absorption column, operating temperature °C. | 35.4 | 35.8 | 35.7 | 35.9 |
| First absorption column, outlet gas flow rate Nm³/hr | 818 | 821 | 709 | 673 |
| First absorption column, hydrocarbon concentration in outlet gas % by volume | 4.14 | 4.95 | 6.21 | 7.09 |
| First absorption column, hydrocarbon concentration in outlet liquid % by weight | 4.6 | 4.9 | 6.3 | 7.1 |
| Second absorption column, inlet liquid flow rate T/hr | 81.8 | 75.8 | 68.3 | 63.7 |
| Second absorption column, operating pressure mm Hg | 760 | 760 | 760 | 760 |
| Second absorption column, operating temperature °C. | 35.3 | 35.3 | 35.3 | 35.3 |
| Second absorption column, outlet gas flow rate Nm³/hr | 789 | 735 | 676 | 638 |
| Second absorption column, hydrocarbon concentration in outlet gas % by volume | 1.53 | 2.06 | 2.72 | 3.10 |
| First desorption | 30 | 33 | 40 | 44 |

TABLE 7-continued

| column, operating pressure mmHg | | | | |
|---|---|---|---|---|
| First desorption column, operating temperature °C. | 35.8 | 36.1 | 36.4 | 36.6 |
| Second desorption column, operating pressure mmHg | 30 | 33 | 40 | 44 |
| Second desorption column, operating temperature °C. | 35.3 | 35.5 | 35.5 | 35.5 |
| Second desorption column, air bubble rate Nm³/hr | 23.1 | 23.1 | 24.8 | 23.3 |
| Second desorption column, inlet gas concentration in outlet gas % by volume | 60.0 | 58.0 | 55.9 | 52.1 |
| Hydrocarbon recovery (first absorption column) % by volume | 86.4 | 87.4 | 88.0 | 88.1 |
| Hydrocarbon recovery (second absorption column % by volume) | 61.6 | 60.1 | 58.2 | 58.5 |
| Hydrocarbon recovery (total) % by volume | 94.8 | 95.0 | 95.0 | 95.1 |
| Vacuum pump flow rate m³/min | 151.0 | 147.3 | 143.6 | 141.3 |

EXAMPLE 3

Corresponding to embodiment 1 (area below curves C'-B, recovery higher than 90% by volume)

TABLE 8

| Hydrocarbon concentration in feeding gas % by volume | 10.6 | 12.7 | 16.0 | 19.9 |
|---|---|---|---|---|
| First absorption column, inlet gas flow rate Nm³/hr | 1000 | 1000 | 1000 | 1000 |
| First absorption column, inlet liquid flow rate T/hr | 98.1 | 96.2 | 93.0 | 88.7 |
| First absorption column, operating pressure mm Hg | 765 | 765 | 765 | 765 |
| First absorption column, operating temperature °C. | 35.1 | 35.1 | 35.2 | 35.3 |
| First absorption column, outlet gas flow rate Nm³/hr | 922 | 903 | 874 | 839 |
| First absorption column, hydrocarbon concentration in outlet gas % by volume | 2.04 | 2.35 | 2.82 | 3.58 |
| First absorption column, hydrocarbon concentration in outlet liquid % by weight | 2.1 | 2.5 | 3.1 | 4.1 |
| Second absorption column, inlet liquid flow rate T/hr | 94.1 | 91.5 | 87.3 | 81.8 |
| Second absorption column, operating pressure mm Hg | 760 | 760 | 760 | 760 |
| Second absorption column, operating temperature °C. | 35.0 | 35.0 | 35.0 | 35.0 |
| Second absorption column, outlet gas flow rate Nm³/hr | 903 | 884 | 854 | 819 |

TABLE 8-continued

| Second absorption column, hydrocarbon concentration in outlet gas % by volume | 1.19 | 1.41 | 1.74 | 2.29 |
|---|---|---|---|---|
| First desorption column, operating pressure mmHg | 16 | 18 | 21 | 26 |
| First desorption column, operating temperature °C. | 35.2 | 35.2 | 35.4 | 35.6 |
| Second desorption column, operating pressure mmHg | 16 | 18 | 21 | 26 |
| Second desorption column, operating temperature °C. | 35.0 | 35.0 | 35.0 | 35.0 |
| Second desorption column, air bubble rate Nm³/hr | — | — | — | — |
| Second desorption column, inlet gas concentration in outlet gas % by volume | 46.9 | 37.2 | 31.4 | 27.7 |
| Hydrocarbon recovery (first absorption column) % by volume | 82.4 | 83.5 | 84.8 | 85.1 |
| Hydrocarbon recovery (second absorption column % by volume) | 42.2 | 40.6 | 39.0 | 36.9 |
| Hydrocarbon recovery (total) % by volume | 89.8 | 90.2 | 90.7 | 90.6 |
| Vacuum pump flow rate m³/min | 103 | 105 | 110 | 109 |

EXAMPLE 3 (Continued)

Corresponding to embodiment 1 (area below curves C'-B, recovery higher than 90% by volume)

TABLE 9

| Hydrocarbon concentration in feeding gas % by volume | 24.6 | 30.0 | 36.5 | 40.2 |
|---|---|---|---|---|
| First absorption column, inlet gas flow rate Nm³/hr | 1000 | 1000 | 1000 | 1000 |
| First absorption column, inlet liquid flow rate T/hr | 83.4 | 77.4 | 69.2 | 67.0 |
| First absorption column, operating pressure mm Hg | 765 | 765 | 765 | 765 |
| First absorption column, operating temperature °C. | 35.4 | 35.7 | 35.8 | 35.9 |
| First absorption column, outlet gas flow rate Nm³/hr | 799 | 753 | 698 | 659 |
| First absorption column, hydrocarbon concentration in outlet gas % by volume | 4.66 | 6.06 | 8.19 | 8.46 |
| First absorption column, hydrocarbon concentration in outlet liquid % by weight | 5.5 | 7.1 | 9.5 | 9.9 |
| Second absorption column, inlet liquid flow rate T/hr | 74.9 | 67.3 | 57.8 | 54.0 |
| Second absorption column, operating pressure mm Hg | 760 | 760 | 760 | 760 |

TABLE 9-continued

| | | | | |
|---|---|---|---|---|
| Second absorption column, operating temperature °C | 35.0 | 35.2 | 35.3 | 35.3 |
| Second absorption column, outlet gas flow rate Nm³/hr | 777 | 728 | 670 | 638 |
| Second absorption column, hydrocarbon concentration in outlet gas % by volume | 3.06 | 4.04 | 5.46 | 5.49 |
| First desorption column, operating pressure mmHg | 33 | 42 | 55 | 55 |
| First desorption column, operating temperature °C | 35.8 | 36.3 | 36.5 | 36.8 |
| Second desorption column, operating pressure mmHg | 33 | 42 | 55 | 55 |
| Second desorption column, operating temperature °C | 35.0 | 35.3 | 35.5 | 35.5 |
| Second desorption column, air bubble rate Nm³/hr | — | — | — | — |
| Second desorption column, inlet gas concentration in outlet gas % by volume | 24.8 | 24.8 | 25.5 | 23.6 |
| Hydrocarbon recovery (first absorption column) % by volume | 85.0 | 84.9 | 84.4 | 86.3 |
| Hydrocarbon recovery (second absorption column % by volume) | 35.4 | 34.7 | 35.3 | 37.1 |
| Hydrocarbon recovery (total) % by volume | 90.3 | 90.2 | 90.0 | 91.3 |
| Vacuum pump flow rate m³/min | 104 | 100 | 91 | 101 |

EXAMPLE 4

Corresponding to embodiment 3 (area below curve C, recovery higher than 95% by volume)

TABLE 10

| | | | | |
|---|---|---|---|---|
| Hydrocarbon concentration in feeding gas % by volume | 10.6 | 12.7 | 16.0 | 19.9 |
| First absorption column, inlet gas flow rate Nm³/hr | 1000 | 1000 | 1000 | 1000 |
| First absorption column, inlet liquid flow rate T/hr | 100.0 | 98.2 | 95.4 | 91.9 |
| First absorption column, operating pressure mm Hg | 765 | 765 | 765 | 765 |
| First absorption column, operating temperature °C | 35.2 | 35.5 | 35.5 | 35.5 |
| First absorption column, outlet gas flow rate Nm³/hr | 914 | 895 | 864 | 828 |
| First absorption column, hydrocarbon concentration in outlet gas % by volume | 1.18 | 1.46 | 1.78 | 2.26 |
| First absorption column, hydrocarbon concentration in outlet liquid % by weight | 1.3 | 1.6 | 2.1 | 2.8 |

TABLE 10-continued

| | | | | |
|---|---|---|---|---|
| Second absorption column, inlet liquid flow rate T/hr | 96.1 | 92.8 | 89.1 | 84.1 |
| Second absorption column, operating pressure mm Hg | 760 | 760 | 760 | 760 |
| Second absorption column, operating temperature °C | 35.0 | 35.3 | 35.3 | 35.3 |
| Second absorption column, outlet gas flow rate Nm³/hr | 897 | 878 | 847 | 810 |
| Second absorption column, hydrocarbon concentration in outlet gas % by volume | 0.54 | 0.72 | 0.92 | 1.23 |
| First desorption column, operating pressure mmHg | 9 | 11 | 13 | 16 |
| First desorption column, operating temperature °C | 35.3 | 35.4 | 35.5 | 35.6 |
| Second desorption column, operating pressure mmHg | 9 | 11 | 13 | 16 |
| Second desorption column, operating temperature °C | 35.5 | 35.5 | 35.5 | 35.5 |
| Second desorption column, air bubble rate Nm³/hr | — | — | — | — |
| Second desorption column, inlet gas concentration in outlet gas % by volume | 66.8 | 55.1 | 60.6 | 56.7 |
| Hydrocarbon recovery (first absorption column) % by volume | 89.9 | 89.9 | 90.5 | 91.0 |
| Hydrocarbon recovery (second absorption column % by volume) | 54.5 | 50.9 | 48.7 | 46.1 |
| Hydrocarbon recovery (total) % by volume | 95.4 | 95.0 | 95.1 | 95.0 |
| Vacuum pump flow rate m³/min | 196.1 | 185.5 | 190.5 | 187.8 |

EXAMPLE 4 (Continued)

Corresponding to embodiment 3 (area below curve C, recovery higher than 95% by volume)

TABLE 11

| | | | | |
|---|---|---|---|---|
| Hydrocarbon concentration in feeding gas % by volume | 24.6 | 30.0 | 36.5 | 40.2 |
| First absorption column, inlet gas flow rate Nm³/hr | 1000 | 1000 | 1000 | 1000 |
| First absorption column, inlet liquid flow rate T/hr | 87.9 | 83.0 | 77.0 | 73.6 |
| First absorption column, operating pressure mm Hg | 765 | 765 | 765 | 765 |
| First absorption column, operating temperature °C | 35.5 | 35.5 | 35.5 | 35.5 |
| First absorption column, outlet gas flow rate Nm³/hr | 783 | 734 | 673 | 639 |
| First absorption column, hydrocarbon concentration in outlet gas % by | 2.72 | 3.64 | 4.77 | 5.56 |

TABLE 11-continued

| | | | | |
|---|---|---|---|---|
| volume | | | | |
| First absorption column, hydrocarbon concentration in outlet liquid % by weight | 3.5 | 4.6 | 6.0 | 6.9 |
| Second absorption column, inlet liquid flow rate T/hr | 78.3 | 71.4 | 63.3 | 58.7 |
| Second absorption column, operating pressure mm Hg | 760 | 760 | 760 | 760 |
| Second absorption column, operating temperature °C. | 35.3 | 35.3 | 35.3 | 35.3 |
| Second absorption column, outlet gas flow rate Nm³/hr | 765 | 714 | 652 | 617 |
| Second absorption column, hydrocarbon concentration in outlet gas % by volume | 1.56 | 2.10 | 2.79 | 3.25 |
| First desorption column, operating pressure mmHg | 19 | 24 | 30 | 34 |
| First desorption column, operating temperature °C. | 35.8 | 36.1 | 36.4 | 36.6 |
| Second desorption column, operating pressure mmHg | 19 | 24 | 30 | 34 |
| Second desorption column, operating temperature °C. | 35.5 | 35.5 | 35.5 | 35.5 |
| Second desorption column, air bubble rate Nm³/hr | — | — | — | — |
| Second desorption column, inlet gas concentration in outlet gas % by volume | 52.4 | 47.2 | 40.6 | 36.6 |
| Hydrocarbon recovery (first absorption column) % by volume | 91.2 | 91.2 | 91.3 | 91.3 |
| Hydrocarbon recovery (second absorption column % by volume) | 44.6 | 43.2 | 42.7 | 42.9 |
| Hydrocarbon recovery (total) % by volume | 95.1 | 95.0 | 95.0 | 95.0 |
| Vacuum pump flow rate m³/min | 191.7 | 181.9 | 174.6 | 168.8 |

We claim:

1. In a process for separating a volatile organic compound from a gas containing the volatile organic compound by introducing the gas into a first absorption column at a lower part in the first absorption column, supplying a first absorption liquid into the first absorption column at an upper part at the first absorption column to contact countercurrently with the gas to absorb a major portion of the volatile organic compound in the gas, introducing the gas leaving the first absorption column and containing a remaining volatile organic compound into a second absorption column at a lower part at the second absorption column, supplying a second absorption liquid into the second absorption column at an upper part of the second absorption column to contact countercurrently with the gas from the first absorption column, supplying the first absorption liquid leaving at a lower part of the first absorption column into a first desorption column at an upper part of the first desorption column, recycling the liquid leaving at a lower part of the first desorption column back to the first absorption column as the first absorption liquid, supplying the second absorption liquid leaving at a lower part of the second absorption column into a second desorption column at an upper part of the second desorption column, recycling the liquid leaving at a lower part of the second desorption column back to the second absorption column as the second absorption liquid, and recovering a remaining volatile organic compound, the improvement which comprises controlling the operating pressure at the first and second desorption columns within the area defined below curve:

$$P = 8.31 + 51f + 200f^2$$

where P is the operating pressure in mmHg and f is the concentration in molar fraction the volatile organic compound in the gas to be fed into the first absorption column, when the concentration is at or less than 0.379 but greater than or equal to 0.100 and within the area defined below line:

$$P = -70f + 83$$

when the concentration is greater than 0.379 but less than or equal to 0.400, to reduce the amount of volatile organic compound in a discharging gas to less than 0.100 when the amount of volatile organic compound in a feeding gas was assumed to be 1.

2. In a process for separating a volatile organic compound from a gas containing the volatile organic compound by introducing the gas into a first absorption column at a lower part of the first absorption column, supplying a first absorption liquid for first absorption into the first absorption column at an upper part of the first absorption column to contact countercurrently with the gas to absorb a major portion of the volatile organic compound in the gas, introducing the gas leaving the first absorption column and containing a remaining volatile organic compound into a second absorption column at a lower part at the second absorption column, supplying a second absorption liquid for second absorption in the second absorption column at an upper part of the second absorption column to contact countercurrently with the gas from the first absorption column, supplying the first absorption liquid leaving at a lower part at the first absorption column into a first desorption column at an upper part of the first desorption column, recycling the liquid leaving at a lower part of the first desorption column back to the first absorption column as the first absorption liquid, supplying the second absorption liquid leaving at a lower part of the second absorption column into a second desorption column at an upper part of the second desorption column, recycling the liquid leaving at a lower part of the second desorption column back to the second absorption column as the second absorption liquid, and recovering a remaining volatile organic compound, the improvement which comprises controlling the operating pressure at the first and the second desorption columns within the area defined below curve:

$$P = 380f/(1-0.90f)$$

where P is the operating pressure in mmHg and f is the concentration in molar fraction of the volatile organic compound in the gas to be fed into the first absorption column, when the concentration is at or less than 0.161 but greater than 0.100, and within the area defined below line:

$$P = -70f + 83$$

when the concentration is greater than 0.161 but less than 0.400, to reduce the amount of volatile organic compound in a discharging gas to less than 0.100 when the amount of volatile organic compound in a feeding gas was assumed to be 1, while introducing air into the second desorption column at a lower part of the second desorption column.

3. In a process for separating a volatile organic compound from a gas containing the volatile organic compound by introducing the gas into a first absorption column at a lower part in the first absorption column, supplying a first absorption liquid into the first absorption column at an upper part at the first absorption column to contact countercurrently with the gas to absorb a major portion of the volatile organic compound in the gas, introducing the gas leaving the first absorption column and containing a remaining volatile organic compound into a second absorption column at a lower part at the second absorption column, supplying a second absorption liquid into the second absorption column at an upper part of the second absorption column to contact countercurrently with the gas from the first absorption column, supplying the first absorption liquid leaving at a lower part of the first absorption column into a first desorption column at an upper part of the first desorption column, recycling the liquid leaving at a lower part of the first desorption column back to the first absorption column as the first absorption liquid, supplying the second absorption liquid leaving at a lower part of the second absorption column into a second desorption column at an upper part of the second desorption column, recycling the liquid leaving at a lower part of the second desorption column back to the second absorption column as the second absorption liquid, and recovering a remaining volatile organic compound, the improvement which comprises controlling the operating pressure at the first and second desorption columns within the area defined below curve:

$$P = 3.86 + 45f + 75.1f^2$$

where P is the operating pressure in mmHg and f is the concentration in molar fraction the volatile organic compound in the gas to be fed into the first absorption column, to reduce the amount of volatile organic compound in a discharging gas to less than 0.005 when the amount of volatile organic compound in a feeding gas was assumed to be 1.

4. In a process for separating a volatile organic compound from a gas containing the volatile organic compound by introducing the gas into a first absorption column at a lower part of the first absorption column, supplying a first absorption liquid for first absorption into the first absorption column at an upper part of the first absorption column to contact countercurrently with the gas to absorb a major portion of the volatile organic compound in the gas, introducing the gas leaving the first absorption column and containing a remaining volatile organic compound into a second absorption column at a lower part at the second absorption column, supplying a second absorption liquid for second absorption in the second absorption column at an upper part of the second absorption column to contact countercurrently with the gas from the first absorption column, supplying the first absorption liquid leaving at a lower part at the first absorption column into a first desorption column at an upper part of the first desorption column, recycling the liquid leaving at a lower part of the first desorption column back to the first absorption column as the first absorption liquid, supplying the second absorption liquid leaving at a lower part of the second absorption column into a second desorption column at an upper part of the second desorption column, recycling the liquid leaving at a lower part of the second desorption column back to the second absorption column as the second absorption liquid, and recovering a remaining volatile organic compound, the improvement which comprises controlling the operating pressure at the first and the second desorption columns within the area defined below curve:

$$P = 190f/(1-0.95f)$$

where P is the operating pressure in mmHg and f is the concentration in molar fraction of the volatile organic compound in the gas to be fed into the first absorption column, when the concentration is at or less than 0.258 but greater than 0.100, and within the area defined below line:

$$P = -70f + 83$$

when the concentration is greater than 0.258 but less than 0.400, to reduce the amount of volatile organic compound in a discharging gas to less than 0.005 when the amount of volatile organic compound in a feeding as was assumed to be 1, while introducing air into the second desorption column at a lower part of the second desorption column.

* * * * *